United States Patent [19]

Misawa et al.

[11] Patent Number: 5,382,465

[45] Date of Patent: Jan. 17, 1995

[54] ANTHRAQUINONIC COLORANT AND POLARIZING FILM CONTAINING THE COLORANT

[75] Inventors: Tsutami Misawa; Hisato Itoh; Tsutomu Nishizawa, all of Yokohama; Masami Nakano; Hiroyuki Katayama, both of Nagoya, all of Japan

[73] Assignee: Mitsui Toatsu Chemicals, Incorporated, Tokyo, Japan

[21] Appl. No.: 62,227

[22] Filed: May 18, 1993

Related U.S. Application Data

[60] Division of Ser. No. 905,505, Jun. 26, 1992, Pat. No. 5,252,769, which is a continuation of Ser. No. 635,427, Jan. 4, 1991, abandoned, which is a continuation of Ser. No. 221,216, Jul. 19, 1988, abandoned.

[30] Foreign Application Priority Data

Jul. 22, 1987 [JP] Japan .................. 62-181253

[51] Int. Cl.$^6$ .................. B32B 9/00
[52] U.S. Cl. .................. 428/195; 428/207; 430/521
[58] Field of Search ........... 428/195, 206, 913, 207; 552/252, 253, 254, 255, 256, 257, 218, 219; 548/151, 156, 219, 218; 430/165, 98, 521

[56] References Cited

U.S. PATENT DOCUMENTS

| | | | |
|---|---|---|---|
| 1,881,697 | 10/1932 | Kunz | 260/60 |
| 3,316,114 | 4/1967 | Caliezi | 552/218 |
| 3,488,195 | 1/1970 | Hunter | 552/218 |
| 3,918,976 | 11/1975 | Arai et al. | 430/521 |

FOREIGN PATENT DOCUMENTS

| | | |
|---|---|---|
| 80975 | 8/1983 | European Pat. Off. .......... 552/251 |
| 546229 | 2/1932 | Germany . |
| 1285078 | 10/1964 | Germany . |
| 57-84409 | 5/1982 | Japan . |
| 58-68008 | 4/1983 | Japan . |
| 60-125804 | 7/1985 | Japan . |
| 348548 | 10/1960 | Switzerland . |
| 449154 | 4/1968 | Switzerland . |
| 887729 | 1/1962 | United Kingdom . |

OTHER PUBLICATIONS

Hahn, Witold E., et al. Roczniki Chemii, Ann. Soc. Chim. Polonorum, 44, (1970), pp. 115 to 119.
Chemical Abstracts, vol. 73, (1970), 36532w.
Dorr, von Friedrich, Z. Elektrochem., 64, (1960), pp. 580 to 582.
Chemical Abstracts, vol. 54, (1960), 20474h.
Chemical Abstracts, 97:25105d.
Chemical Abstracts, vol. 52, 17719e.
Chemical Abstracts, 1958–Subject Index, p. 241-s.
Zollinger, Heinrich, Color Chemistry-Syntheses, Properties and Applications of Organic Dyes and Applications, VCH, (1987) pp. 177 to 179, 184 and 185.
Venkataraman, K., The Chemistry of Synthetic Dyes, vol. II, (1952), pp. 915 to 945.
Colour Index, 3rd Ed., vol. 4, Great Britain, (1971), 613, 4562, 4566, 4589 and 5528 to 5531.
Kirk-Othmer, Encyclopedia of Chemical Technology, 3rd Ed., vol. 17, (1982), pp. 862 to 864.
Reid, W., et al., Melliand, 39, (Jul. 1953), pp. 780 to 786.

*Primary Examiner*—Patrick J. Ryan
*Assistant Examiner*—Patrick Jewik
*Attorney, Agent, or Firm*—Fisher, Christen & Sabol

[57] ABSTRACT

Anthraquinonic colorant represented by the formula (I):

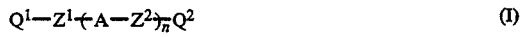

$$Q^1-Z^1+A-Z^2\}_n Q^2 \qquad (I)$$

wherein $Q^1$ and $Q^2$ are each independently substituted or unsubstituted anthraquinonyl groups, $Z^1$ and $Z^2$ are bridge groups, A is an aromatic divalent group, and n is 0 or 1. The polarizing film contains at least one colorant of present invention in a hydrophobic resin. The film has excellent durability and moisture resistance.

2 Claims, No Drawings

ANTHRAQUINONIC COLORANT AND POLARIZING FILM CONTAINING THE COLORANT

This is a divisional application of Ser. No. 07/905,505, filed on Jun. 26, 1992, now U.S. Pat. No. 5,252,769, which is a continuation of Ser. No. 07/635,427, filed on Jan. 4, 1991, (now abandoned), which is a continuation of Ser. No. 07/221,216, filed on Jul. 19, 1988, (now abandoned).

BACKGROUND OF THE INVENTION

1. Field of the Invention

This invention relates to an anthraquinonic colorant and a polarizing film containing the colorant in oriented condition.

2. Description of the Prior Art

As the polarizing film which is commonly used today, polyvinyl alcohol is employed as film base resin. Polarizing properties of the film are provided by the dichroic substances such as iodine compounds and/or the acid dyes or the direct dyes having selected structures.

Although these polarizing film exhibits excellent polarizing properties, it is insufficient in their durability. Therefore, in common, their durability is improved by covering both sides of the film with moisture-resistant film-like materials (protective membranes) which are transparent at least on one side. In other words, the internal polarizing film is very poor in durability and is guarded by the protective membranes or layers for practical durability.

Coupled with the recent widespread use of liquid crystal display elements for vehicles, computers and industrial instruments, improved durability of the polarizing film to prepare these elements are strongly desired, particularly, in terms of resistance against moisture, weather and heat. Polarizing films using a hydrophobic polymer as the film base resin have been proposed consequently, to improve these properties. Examples of these known arts include Japanese Patent Laid-Open No. 84409/1982 and the present inventors' applications such as Japanese Patent Laid-Open Nos. 68008/1983 and 125804/1985. While polarizing films according to these known applications have sufficient durability, but they are not always satisfactory in view of the polarizing ability.

SUMMARY OF THE INVENTION

An object of this invention is to provide an anthraquinonic colorant suitable for a polarizing film using a hydrophobic polymer as a film base resin.

Another object of this invention is to provide a polarizing film which contains the colorant in an oriented condition and is excellent in polarizing ability as well as in durability such as moisture and weather resistance.

The anthraquinonic colorant of this invention is represented by the formula (I):

(I)

wherein $Q^1$ and $Q^2$ are each independently a substituted or unsubstituted anthraquinonyl group, $Z^1$ and $Z^2$ are each a bridge group, A is an aromatic divalent group, and n is 0 or 1.

DETAILED DESCRIPTION OF THE INVENTION

The colorant is a compound which has chromophores on both ends of the molecule. One or more bridge groups or aromatic divalent groups combine both ends to keep a planar and linear configuration in the molecule. The bridge group represented by $Z^1$ and $Z^2$ in the formula (I) is —O—, —S—, —CH$_2$—, —CO—, —SO$_2$—, —SO$_2$NH—, —CH=N—, —CH=CH—, —COO— or —CONH—. Particularly preferred group of $Z^1$ or $Z^2$ is —CH=N—, —CH=CH—, —COO— or —CONH—.

When n represents zero, $Z^1$ can be a group of —CH=N—N=CH— or —CONHNHOC—.

The aromatic divalent group represented by A is preferably an aromatic group and is in between of $Z^1$ and $Z^2$ along the major axis of the group. Examples of the particularly preferred groups include those having the formulas (IIa)–(IIg):

(IIa)

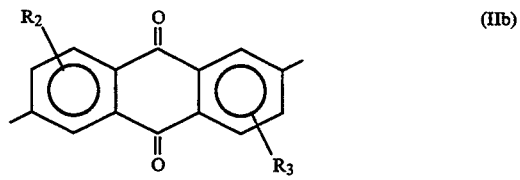

(IIb)

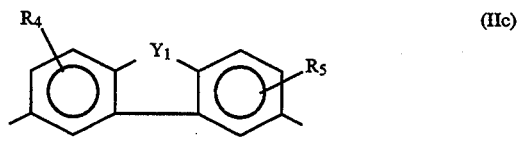

(IIc)

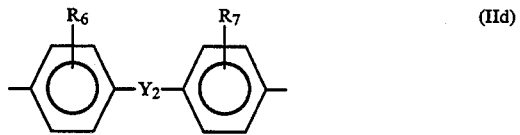

(IId)

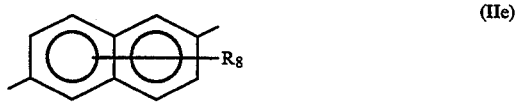

(IIe)

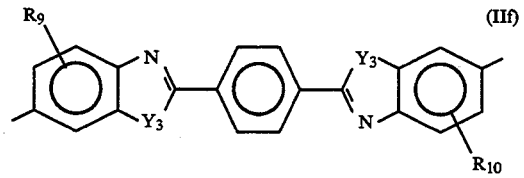

(IIf)

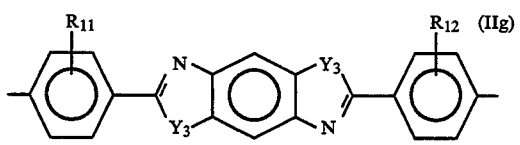

(IIg)

wherein $R_1$ to $R_{12}$ are each independently a hydrogen atom, halogen atom, methyl group, hydroxyl group or methoxy group, $Y_1$ is —CO— or —O—, $Y_2$ is —NH- CO—, —O—, —S—, —SO₂— or —CO—, Y₃ is —O— or —S—, and m is 1-6.

The anthraquinonyl groups represented by Q¹ and Q² can have substituents which include an amino group, alkylamino group, hydroxyl group, alkoxy group, halogen atom, alkoxycarbonyl group, cyano group, sulfonylamino group and nitro group. The preferred anthraquinonyl group is represented by the formula (III): and is bonded to the bridge group Z¹ or Z² at the β position.

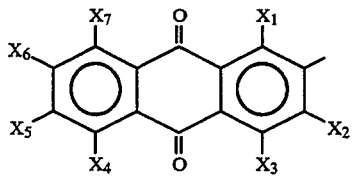

(III)

X₁ to X₇ are each independently a hydrogen atom, halogen atom, hydroxyl group, amino group or lower alkylamino group.

More preferred examples of the anthraquinonyl group include those having the formulas (IIIa)–(IIIg):

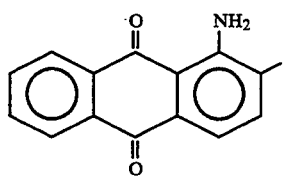

(IIIa)

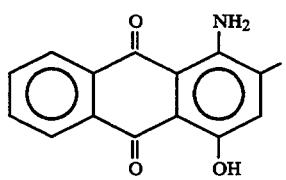

(IIIb)

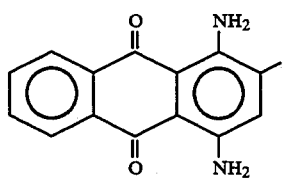

(IIIc)

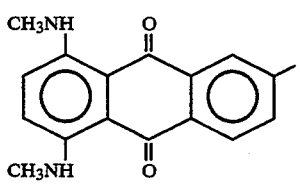

(IIId)

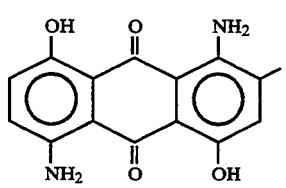

(IIIe)

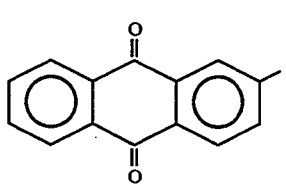

(IIIf)

-continued

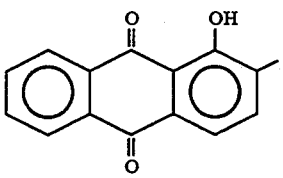

(IIIg)

The anthraquinonic colorant of the present invention is the dichroic colorant having the chemical structure suitable for preparing the polarizing film using a hydrophobic polymer as its film base.

The suitability of the colorant is understood to be that its molecular structure is a long linear bar, that aromatic rings which constitute the molecule easily lie on the same plane, that a long conjugated system exists, and that the bridge group and functional group have interaction with the film base. Therefore, the colorant can be arranged parallel to the oriented molecules to constitute the film.

The colorant of the formula (I) can be prepared by a reaction in a solvent and optionally in the presence of a base of one or two kinds of anthraquinone derivatives represented by the formula (IV):

$$Q—Z^3 \quad \quad (IV)$$

wherein Q is the same anthraquinonyl group as Q¹ or Q², and Z³ is —CHO, —COCl, —SO₂Cl or a halogen atom, with a compound represented by the formula (V):

$$Z^4—A—Z^5 \quad \quad (V)$$

wherein A is the same as A of the formula (I), and Z⁴ and Z⁵ are each independently a reactive group, for example, an amino group, hydroxyl group, thiol group, X⊖R₃P⊕—CH₂— or

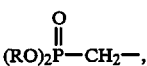

which is requisite for forming a bridge group Z¹ or Z² by reacting with Z³.

The molar ratio of the compound of the formula (V) to the total moles of the anthraquinone derivatives of the formula (IV) is preferably in the range of 0.3–0.7.

The base which can be used in this reaction includes, for example, inorganic compounds such as sodium hydroxide, potassium hydroxide, calcium hydroxide, magnesium hydroxide, sodium hydride and ammonium hydroxide; alkoxides such as sodium methoxide, sodium ethoxide, potassium butoxide and lithium methoxide; carboxylic acid salts such as sodium acetate, potassium acetate and ammonium acetate; nitrogen-containing compounds such as diazabicycloundecene, piperidine and pyridine; and alkyl or aryl metal compounds such as methyl lithium, butyl lithium, phenyl magnesium bromide and lithium dipropyl nitride.

The solvent is used 1–100 times by weight of the compound of the formula (I). The preferred examples of the solvents used in the reaction include aprotic polar solvents such as dimethylformamide, dimethylsulfoxide, sulfolane and dimethylimidazolidinone; aromatic solvents such as benzene, toluene, xylene, chlorobenzene, dichlorobenzene, chloronaphthalene and nitrobenzene; alcohols such as methanol, ethanol and propanol; and carboxylic acids such as acetic acid and propionic acid.

The preferred reaction temperature is from room temperature to 200° C. The reaction time is preferably 1–20 hours.

Although the intact crude product of the colorant can be used to prepare the polarizing film of the present invention, it is preferable to purify prior to using by such a method as recrystallization. It is also preferred to use the colorant after grinding it into powder having a particle size of several microns or less.

The polarizing film of the present invention contains at least one colorant described above. Several colorant can be selected and used in mixture to obtain the preferred hue, particularly, to provide a neutral grey polarizing film. Further, materials which may also be contained in the film include dichroic colorant other than those of the present invention and, if necessary, additives such as coloring agents without dichroism, ultraviolet absorbers and other miscellaneous substances.

Any type of hydrophobic resin can be used to prepare the polarizing film of the present invention as long as the molecular structure of the resin is an organic polymer composed of a linear configuration without containing hydrophilic groups.

The preferred hydrophobic resins are those having thermoplastic properties and practically include, for example, halogenized polyvinyl resin, polyacrylate resin, polyolefin resin, polyamide resin, polyimide resin, polyester resin, polycarbonate resin and polyether sulfone resin. Particularly preferred resin compositions are those containing at least 80% by weight of aromatic polyester resin components such as polyethylene terephthalate, polyethylene naphthylenedicarboxylate, polybutylene terephthalate and polyethylene bis-$\alpha,\beta$-(2-chlorophenoxy)ethane-4,4'-dicarboxylate which are excellent in high-temperature stability, moisture resistance and transparency.

The proportion of the colorant applied to the base resin such as the above hydrophobic resin is determined by considering the tinctorial power of the colorant and the thickness of the desired polarizing film. The proportion is preferably adjusted so as to obtain a visible-ray transmittance of 30–60% per sheet of polarizing film obtained. When the thickness of the polarizing film is, for example, 30–200 μm, the proportion of the colorant to the base resin is in the range of 0.01–10% by weight.

At least one of the colorant of the present invention and other coloring materials, if necessary, are mixed with a base resin to prepare the polarizing film of the present invention. The resultant mixture is fused to obtain a colored compound. The compound is molded in the form of a film or sheet and stretched to prepare the polarizing film.

The polarizing film thus prepared can be further processed into various structures of film and sheet according to application and put to practical use.

The following film structures are illustrated as examples of processing:
a) The intact film prepared above.
b) Integrated sheet or film obtained by providing a protective membrane or layer to one or both surfaces of the polarizing film. The protective membrane or layer is composed of, for example, colored or uncolored glass or synthetic resin and has excellent optical transparency and mechanical strength.
c) Integrated film or sheet obtained by furnishing a pressure-sensitive adhesive layer on one or both surfaces of the polarizing film for convenience in applying it to liquid crystal displays for general purpose use, window panes or eyeglasses.
d) Integrated film obtained by setting transparent electroconductive membrane of indium-tin base oxide on the surface of the polarizing film with a known process such as vapor deposition, sputtering or coating. These films and sheets can also be utilized as materials for forming cells of liquid crystal display elements.

EXAMPLES

Typical examples of the colorant in this invention and the polarizing films prepared from the same will hereafter be illustrated in detail.

The degree of polarization was determined by the following method. Two sheets of the polarizing film were overlapped so as to make their stretched directions parallel to each other, and placed in the optical path of a spectrophotometer and their transmittance ($T_{11}$) was measured at the wavelength of maximum absorption in the visible region. Then two sheets of the polarizing film were overlapped so as to make their stretched directions perpendicular to each other and their transmittance ($T_\perp$) was measured by the same procedures as above. The degree of polarization (V) was calculated by the following equation:

$$V(\%) = \sqrt{\frac{T_{11} - T_\perp}{T_{11} + T_\perp}} \times 100$$

Example 1

10 g of 1-amino-anthraquinone-2-carboxyaldehyde and 3.7 g of benzidine were added into 200 ml of nitrobenzene and stirred at 210° C. for 4 hours. The reaction mixture was cooled to room temperature. The resultant precipitate was filtered, washed with a small amount of nitrobenzene and successively washed with N,N-dimethylformamide and methanol. Then the precipitate was dried to obtain 12 g of the following colorant having a melting point of above 300° C.:

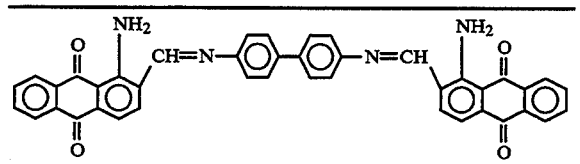

| Elementary analysis | C | H | N |
|---|---|---|---|
| Calculated (%) | 77.53 | 4.03 | 8.61 |
| Analyzed (%) | 77.30 | 3.95 | 8.72 |

The colorant thus obtained was added to pellets of polyethylene terephthalate resin in an amount so that the unit transmittance of the resultant polarizing film was 40%, uniformly mixed and then molded by melt extrusion to obtain a sheet having a thickness of about 200 μm. The sheet was stretched perpendicular to the extruded direction by 5 times at 80° C. by using a tenter stretching machine, and heated at 150° C. for one minute. The red polarizing film thus obtained had a thickness of 100 μm and an excellent polarization degree of 99.9% at the maximum absorption wavelength of 540 nm. The polarizing film was allowed to stand for 500 hours 80° C. and 90% relative humidity. As a result, neither substantial change in the hue nor decline in the degree of polarization was found. Shrinkage of the film was 1% or less in both parallel and perpendicular directions, and good dimensional stability of the film confirmed subsequently.

Example 2

A solution of 9.1 g of 4,4'-bis (diethoxyphosphonomethyl)biphenyl in 120 ml of N,N-dimethylformamide was added into a solution of 1.4 g of metallic sodium dissolve in 40 ml of ethanol and stirred for 30 minutes at room temperature. To the resultant solution, 10 g of 1-amino-anthraquinone-2-carboxyaldehyde was added and stirred for 4 hours at room temperature. The precipitate formed was filtered, washed successively with N,N-dimethylformamide and methanol, and dried to obtain 11 g of the following colorant having a melting point of above 300° C:

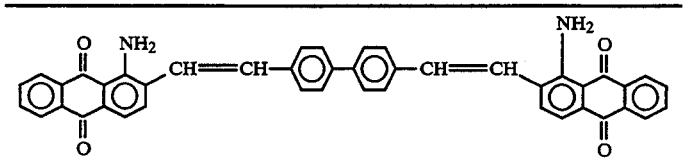

| Elementary analysis | C | H | N |
|---|---|---|---|
| Calculated (%) | 81.47 | 4.35 | 4.32 |
| Analyzed (%) | 81.26 | 4.21 | 4.15 |

The colorant thus obtained was processed by the same molding procedures as in Example 1 to prepare a red polarizing film. The polarizing film had a polarization degree of 99.9% at the maximum absorption wavelength of 530 nm. As a result of the same durability test as in Example 1, the film showed no decline in the degree of polarization, and had good dimensional stability.

Example 3

A mixture consisting of 60 g of 1-amino-2-formylanthraquinone, 28 g of 2,6-diaminoanthraquinone and 3 l of acetic acid was reacted for 4 hours under reflux. Crystals were hot filtered from the reaction mixture to obtain 70 g of a colorant having the following formula:

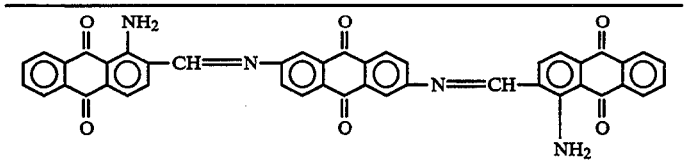

| Elementary analysis | | C | H | N |
|---|---|---|---|---|
| Calculated (%) | - | 75.00 | 3.41 | 7.95 |
| Analyzed (%) | | 74.93 | 3.40 | 7.89 |

The colorant thus obtained was processed by the same molding procedures as in Example 1 to prepare a red polarizing film. The polarizing film had a polarization degree of 99.9% at the maximum absorption wavelength of 545 nm. As a result of the same durability test as in Example 1, the film had good durability.

Example 4

To a solution of 0.7 g of metallic sodium dissolved in 100 ml of ethanol, a solution of 2.3 g of 4,4'-bis(diethoxyphosphonomethyl)biphenyl in N,N-dimethylformamide was added dropwise and reacted for one hour at room temperature. To the mixture thus obtained, a solution of 3 g of 2-formylanthraquinone in N,N-dimethylformamide was added dropwise and reacted for 2 hours at room temperature. The separated crystals were filtered and dried to obtain 3.5 g of a colorant having the following formula:

| Elementary analysis | C | H |
|---|---|---|
| Calculated (%) | 85.42 | 4.24 |
| Analyzed (%) | 85.71 | 4.01 |

The colorant thus obtained was processed by the same molding procedures as in Example 1 to prepare a red polarizing film. The polarizing film had a polarization degree of 99.9% at the maximum absorption wavelength of 445 nm. The film also had good durability.

Examples 5-19

Fifteen anthraquinonic colorants illustrated in Table 1 were prepared by the same procedures as in Examples 1 and 2. The hues and chemical structures of these colorants are illustrated in Table 1. The results of the elementary analysis of these colorants are illustrated in Table 2. Polarizing films containing those colorants were prepared by using the same molding procedures as in Examples 1 and 2. All of these polarizing films had excellent polarizing ability.

TABLE 1

| Example | Anthraquinonic colorant | Hue |
|---|---|---|
| 5 | | red |
| 6 | | blue |
| 7 | | blue |
| 8 | | yellow |
| 9 | | red |
| 10 | | blue |
| 11 | | blue |
| 12 | | blue |

TABLE 1-continued

| Example | Anthraquinonic colorant | Hue |
|---|---|---|
| 13 | [structure: bis-anthraquinone linked by CH=N–biphenyl–CH=CH with OH, NH₂ substituents] | blue |
| 14 | [structure: anthraquinone-CONH-anthraquinone-OOC-anthraquinone with OH groups] | yellow |
| 15 | [structure: bis-anthraquinone linked by CH=N–N=CH with NH₂, OH substituents] | red |
| 16 | [structure: bis-anthraquinone linked by CH=CH–phenyl–N=CH with NHCH₃ substituents] | blue |
| 17 | [structure: anthraquinone-CH=CH-biphenyl-OOC-anthraquinone] | yellow |
| 18 | [structure: bis-anthraquinone linked by CH=CH–naphthyl–CH=CH with NH₂ substituents] | red |
| 19 | [structure: bis-anthraquinone linked by CONHNHCO with NH₂ substituents] | blue |

TABLE 2

| Example | Elementary analysis (%) | | | |
|---|---|---|---|---|
| | C | H | N | Cl |
| 5 | 71.02 | 3.15 | 3.62 | — |
|   | (71.55 | 3.00 | 3.79 | —) |
| 6 | 69.05 | 3.33 | 11.02 | — |
|   | (68.93 | 3.42 | 10.96 | —) |
| 7 | 68.51 | 3.99 | 11.00 | — |
|   | (68.38 | 4.17 | 10.88 | —) |
| 8 | 82.40 | 4.31 | — | — |
|   | (82.63 | 4.16 | — | —) |
| 9 | 70.51 | 3.62 | 4.08 | — |
|   | (70.39 | 3.38 | 3.91 | —) |
| 10 | 66.11 | 4.23 | 9.95 | 8.62 |
|    | (65.95 | 4.09 | 10.03 | 8.46) |

TABLE 2-continued

| Example | Elementary analysis (%) | | | |
|---|---|---|---|---|
| | C | H | N | Cl |
| 11 | 71.52 | 3.40 | 7.60 | — |
| | (71.41 | 3.28 | 7.61 | —) |
| 12 | 69.12 | 3.11 | 11.21 | — |
| | (68.93 | 3.42 | 10.96 | —) |
| 13 | 69.72 | 4.08 | 9.10 | — |
| | (69.44 | 3.93 | 9.42 | —) |
| 14 | 71.61 | 3.01 | 1.96 | — |
| | (71.45 | 2.86 | 1.89 | —) |
| 15 | 68.18 | 3.61 | 10.28 | — |
| | (67.92 | 3.42 | 10.56 | —) |
| 16 | 73.33 | 4.31 | 12.75 | — |
| | (73.16 | 4.30 | 12.80 | —) |
| 17 | 80.89 | 3.94 | — | — |
| | (81.12 | 3.80 | — | —) |
| 18 | 80.86 | 4.45 | 4.71 | — |
| | (81.01 | 4.21 | 4.50 | —) |
| 19 | 63.89 | 3.72 | 15.11 | — |
| | (64.28 | 3.60 | 14.99 | —) |

( ) indicates calculated value

Comparative Example

The colorant disclosed in Japanese Patent Laid-Open No. 125804/85 was tested.

The colorant has the following formula:

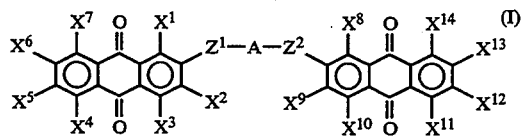

The colorant does not contain the bridge group of this invention. The aromatic divalent group located in the center of the molecule does not have a structure suitable for maintaining the planar and linear configuration of the whole molecule. Therefore, the polarizing ability of this colorant was inferior to that of this invention.

What is claimed is:

1. A polarising film comprising a hydrophobic polymer, as a film base, and an anthraquinonic colorant represented by formula (1):

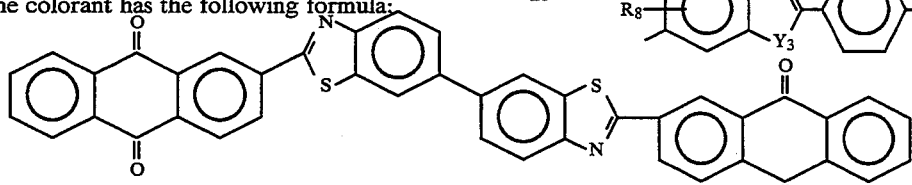

wherein $X'$ is a hydroxyl group, an amino group or a lower alkylamino group; $X^2$ to $X^{14}$ are each independently a hydrogen atom, a halogen atom, a hydroxyl group, an amino group or a lower alkylamino group; $Z^1$ and $Z^2$ are each independently —N=CH—, —CH=CH— or —COO—; and A is an aromatic divalent group shown as follows:

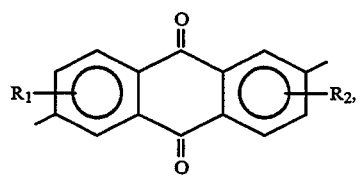

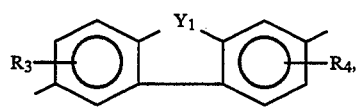

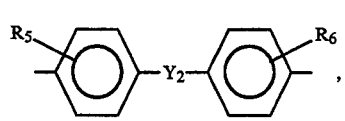

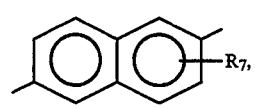

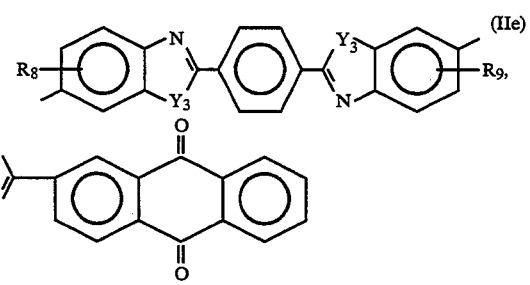

or

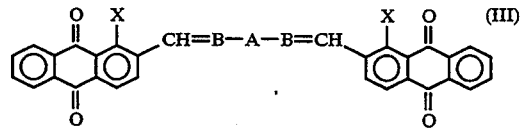

wherein $R_1$ to $R_{11}$ are independently a hydrogen atom, a halogen atom, a methyl group, a hydroxyl group or a methoxy group, $Y_1$ is —CO— or —O—, $Y_2$ is —NHCO—, —O—, —S—, —SO$_2$— or —CO—, and $Y_3$ is —O— or —S—.

2. The polarising film as claimed in claim 1, wherein the anthraquinonic colorant is represented by formula (III):

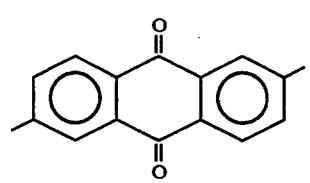

wherein A is:

B is CH or N, and X is NH$_2$, OH or an alkylamino group having 1 to 4 carbon atoms.

* * * * *